United States Patent
Abe et al.

(10) Patent No.: US 8,228,161 B2
(45) Date of Patent: Jul. 24, 2012

(54) SEMICONDUCTOR CERAMIC AND POSITIVE TEMPERATURE COEFFICIENT THERMISTOR

(75) Inventors: Naoaki Abe, Nagaokakyo (JP); Hayato Katsu, Nagaokakyo (JP); Masato Goto, Nagaokakyo (JP); Atsushi Kishimoto, Nagaokakyo (JP); Akinori Nakayama, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 13/104,298

(22) Filed: May 10, 2011

(65) Prior Publication Data

US 2011/0210815 A1    Sep. 1, 2011

Related U.S. Application Data

(63) Continuation of application No. PCT/JP2009/070757, filed on Dec. 11, 2009.

(30) Foreign Application Priority Data

Dec. 12, 2008   (JP) ................................. 2008-317473

(51) Int. Cl.
   *H01C 7/10* (2006.01)
(52) U.S. Cl. .................. 338/22 SD; 338/22 R; 338/320; 338/224; 501/134; 252/511; 428/404
(58) Field of Classification Search ................ 338/22 R, 338/24, 320, 223, 224; 501/134, 123; 252/500, 252/511–514; 428/404, 325, 328, 331
See application file for complete search history.

(56) References Cited

U.S. PATENT DOCUMENTS

| | | | | |
|---|---|---|---|---|
| 4,956,320 | A | * | 9/1990 | Asakura et al. ............... 501/137 |
| 5,414,403 | A | * | 5/1995 | Greuter et al. ............... 338/22 R |
| 5,814,849 | A | * | 9/1998 | Azuma et al. ................. 257/295 |
| 6,221,800 | B1 | * | 4/2001 | Takahashi et al. ............ 501/137 |
| 6,542,067 | B1 | * | 4/2003 | Kawamoto .................. 338/22 R |
| 7,764,161 | B2 | | 7/2010 | Katsu et al. |
| 8,093,170 | B2 | * | 1/2012 | Katsu ........................... 501/134 |
| 2009/0201121 | A1 | | 8/2009 | Katsu et al. |

FOREIGN PATENT DOCUMENTS

| | | |
|---|---|---|
| JP | 56-169301 A | 12/1981 |
| JP | 05-275203 A | 10/1993 |
| JP | 07-187770 A | 7/1995 |
| JP | 10152372 * | 9/1998 |
| JP | 2005-255493 A | 9/2005 |
| WO | WO-2008-038538 A1 | 4/2008 |

OTHER PUBLICATIONS

Written Opinion of the International Searching Authority, mailed Feb. 16, 2010.

* cited by examiner

*Primary Examiner* — Kyung Lee
(74) *Attorney, Agent, or Firm* — Dickstein Shapiro LLP

(57) ABSTRACT

A semiconductor ceramic includes a $BaTiO_3$-based composition, as a main component, having a perovskite structure represented by general formula $A_mBO_3$. Part of the A site Ba is replaced with an alkali metal element, Bi, Ca, Sr, and a rare-earth element. When the molar amounts of Ca and Sr are x and y, respectively, and the total number of moles of the elements constituting the A site is 1 mole, $0.05 \leq x \leq 0.20$, $0.02 \leq y \leq 0.12$, and $2x+5y \leq 0.7$. A PTC thermistor includes a component body formed of the semiconductor ceramic. Even when an alkali metal element and Bi are present, there is provided a lead-free semiconductor ceramic with high reliability in which the surface discoloration is not caused and the degradation of resistance over time can be suppressed even after the application of an electric current for a long time.

20 Claims, 3 Drawing Sheets

SEMICONDUCTOR CERAMIC AND POSITIVE TEMPERATURE COEFFICIENT THERMISTOR

This is a continuation of application Serial No. PCT/JP2009/070757, filed Dec. 11, 2009, the entire contents of which are hereby incorporated by reference herein.

TECHNICAL FIELD

The present invention relates to a semiconductor ceramic and a positive temperature coefficient thermistor, and specifically to a semiconductor ceramic having a positive temperature coefficient (hereinafter referred to as "PTC characteristic") and a positive temperature coefficient thermistor (hereinafter referred to as "PTC thermistor") used for a heater or the like.

BACKGROUND ART

A barium titanate ($BaTiO_3$)-based semiconductor ceramic generates heat upon the application of a voltage and has PTC characteristics in which the resistance value rapidly increases when the temperature exceeds the Curie temperature Tc at which phase transition takes place from a tetragonal crystal to a cubic crystal.

In such a semiconductor ceramic having PTC characteristics, the resistance value increases when the temperature exceeds the Curie temperature Tc because of the generation of heat caused by the application of a voltage. As a result, current does not easily flow and the temperature is decreased. When the temperature is decreased and thus the resistance value is decreased, current flows easily again and the temperature becomes increased. In such a semiconductor ceramic, by repeating the above-described process, the temperature or current is caused to converge to a certain temperature or current. Therefore, such a semiconductor ceramic is widely used as a thermistor for a heater or a motor starting device.

Since a PTC thermistor used for a heater or the like is used at high temperature, the Curie temperature Tc is required to be high. The Curie temperature Tc has been conventionally increased by replacing part of Ba of $BaTiO_3$ with Pb.

However, Pb is an environmentally unfriendly substance and thus, in consideration of environment, the development of a lead-free semiconductor ceramic that substantially does not contain Pb has been demanded.

For example, Patent Document 1 discloses a method for producing a $BaTiO_3$-based semiconductor ceramic, the method including adding at least one of Nb, Ta, and a rare-earth element to $Ba_{1-2x}(BiNa)_xTiO_3$ (where $0<x\leq0.15$) obtained by replacing part of Ba of $BaTiO_3$ with Bi—Na, sintering the structure in a nitrogen atmosphere, and performing a heat treatment in an oxidizing atmosphere.

In Patent Document 1, there is provided a lead-free $BaTiO_3$-based semiconductor ceramic having a high Curie temperature Tc of 140 to 255° C. and a temperature coefficient of resistance of 16 to 20%/° C.

Patent Document 2 discloses a semiconductor ceramic composition whose composition formula is represented by $[(A1_{0.5}A2_{0.5})_x(Ba_{1-y}Q_y)_{1-x}]TiO_3$ (where A1 is at least one of Na, K, and Li, A2 is Bi, and Q is at least one of La, Dy, Eu, and Gd), wherein the x and y satisfy $0<x\leq0.2$ and $0.002\leq y\leq0.01$.

Patent Document 2 provides a lead-free semiconductor ceramic composition having a Curie temperature Tc of 130° C. or more.

[Patent Document 1] Japanese Unexamined Patent Application Publication No. 56-169301
[Patent Document 2] Japanese Unexamined Patent Application Publication No. 2005-255493

PROBLEMS TO BE SOLVED BY THE INVENTION

However, PTC thermistors containing an alkali metal element and Bi as described in Patent Documents 1 and 2 have problems in that the resistance value is significantly varied and degraded and the surface of a thermistor, particularly an outer electrode on the anode side, is discolored after the application of an electric current for a long time.

That is, part of Ba is replaced with an alkali metal element and Bi to increase the Curie temperature Tc in the semiconductor ceramics disclosed in Patent Documents 1 and 2, but the alkali metal element and Bi are volatile. In particular, Bi has a high volatility and is believed to be volatilized more easily than the alkali metal element during firing. As a result, it is believed that unstable Na is eluted and thus the resistance value becomes degraded over time, and discoloration is caused due to the ionic conduction to the outer electrode on the anode side.

A conventional PTC thermistor containing an alkali metal element and Bi in such a manner has insufficient reliability because the resistance value is degraded over time and the surface discoloration is caused after the application of an electric current for a long time.

In view of the foregoing, an object of the present invention is to provide a lead-free semiconductor ceramic with high reliability in which the discoloration of a surface is not caused and the degradation of resistance over time can be suppressed even after the application of an electric current for a long time, even when an alkali metal element and Bi are contained, and a PTC thermistor that uses the semiconductor ceramic.

MEANS FOR SOLVING THE PROBLEMS

Through the intensive study of a $\{Ba,(M1,Bi), Ca,Ln)\}_m TiO_3$-based material (M1 is an alkali metal element and Ln is a rare-earth element) having a perovskite structure (general formula $A_mBO_3$), the inventors of the present invention have found that, by replacing part of Ba with Ca and also Sr and setting the molar ratios of Ca and Sr within a predetermined range, the surface discoloration can be prevented and the degradation of resistance can be suppressed even after the application of an electric current for a long time.

The present invention is based on the finding described above. The semiconductor ceramic according to the present invention is a lead-free semiconductor ceramic that substantially does not contain lead, the semiconductor ceramic including a $BaTiO_3$-based composition, as a main component, having a perovskite structure represented by general formula $A_mBO_3$, wherein part of Ba constituting an A site is replaced with an alkali metal element, Bi, Ca, Sr, and a rare-earth element; and, assuming that the molar ratio of the Ca is x and the molar ratio of the Sr is y, the contents of the Ca and the Sr when the total number of moles of the elements constituting the A site is 1 mole are determined so as to satisfy $0.05\leq x\leq0.20$, $0.02\leq y\leq0.12$, and $2x+5y\leq0.7$.

Herein, the phrase "substantially does not contain lead" means that Pb is not added intentionally. Such a composition system to which Pb is not added intentionally is referred to as a lead-free system in the present invention.

The content of the Ca is determined so as to satisfy $0.125\leq x\leq0.175$.

In the semiconductor ceramic of the present invention, the alkali metal element is at least one of Na and K.

A PTC thermistor according to the present invention includes a component body and a pair of outer electrodes formed on the surfaces of the component body, wherein the component body is formed of the semiconductor ceramic.

ADVANTAGES

The semiconductor ceramic of the present invention includes a BaTiO$_3$-based composition, as a main component, having a perovskite structure represented by general formula A$_m$BO$_3$, wherein part of Ba in the A site is replaced with an alkali metal element, Bi, Ca, Sr, and a rare-earth element; and, assuming that the molar ratio of the Ca is x and the molar ratio of the Sr is y, the contents of the Ca and the Sr in the A site are determined so as to satisfy $0.05 \leq x \leq 0.20$, $0.02 \leq y \leq 0.12$, and $2x+5y \leq 0.7$. Therefore, a semiconductor ceramic can be provided with high reliability in which the surface discoloration is not caused and the variation of a resistance value is suppressed even after the application of an electric current for a long time.

The PTC thermistor of the present invention includes a component body and a pair of outer electrodes formed on the surfaces of the component body, wherein the component body is formed of the semiconductor ceramic described above. Therefore, there can be provided a PTC thermistor with high reliability while ensuring desired PTC characteristics.

Specifically, there can be provided a lead-free PTC thermistor having a Curie temperature of 120° C. or more and high reliability. In the PTC thermistor, the discoloration of a surface is not caused and the percentage change in resistivity can be decreased to 30% or less even after a voltage that increases the temperature of the surface of a component body to 200° C. is continuously applied for 1000 hours.

An embodiment of the present invention will now be described.

The main component of a semiconductor ceramic according to an embodiment of the present invention has a perovskite structure represented by general formula (A).

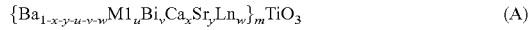

$\{Ba_{1-x-y-u-v-w}M1_uBi_vCa_xSr_yLn_w\}_mTiO_3$     (A)

M1 is an alkali metal element represented by Li, Na, and K. Ln is a rare-earth element serving as a semiconductorizing agent. The rare-earth element Ln is not particularly limited as long as it serves as a semiconductorizing agent, and at least one selected from the group consisting of Y, Sm, Nd, Dy, and Gd can be preferably used.

The molar amount x of Ca and the molar amount y of Sr in an A site satisfy mathematical formulas (1), (2), and (3).

$0.05 \leq x \leq 0.20$     (1)

$0.02 \leq y \leq 0.12$     (2)

$2x+5y \leq 0.7$     (3)

Figure 1:
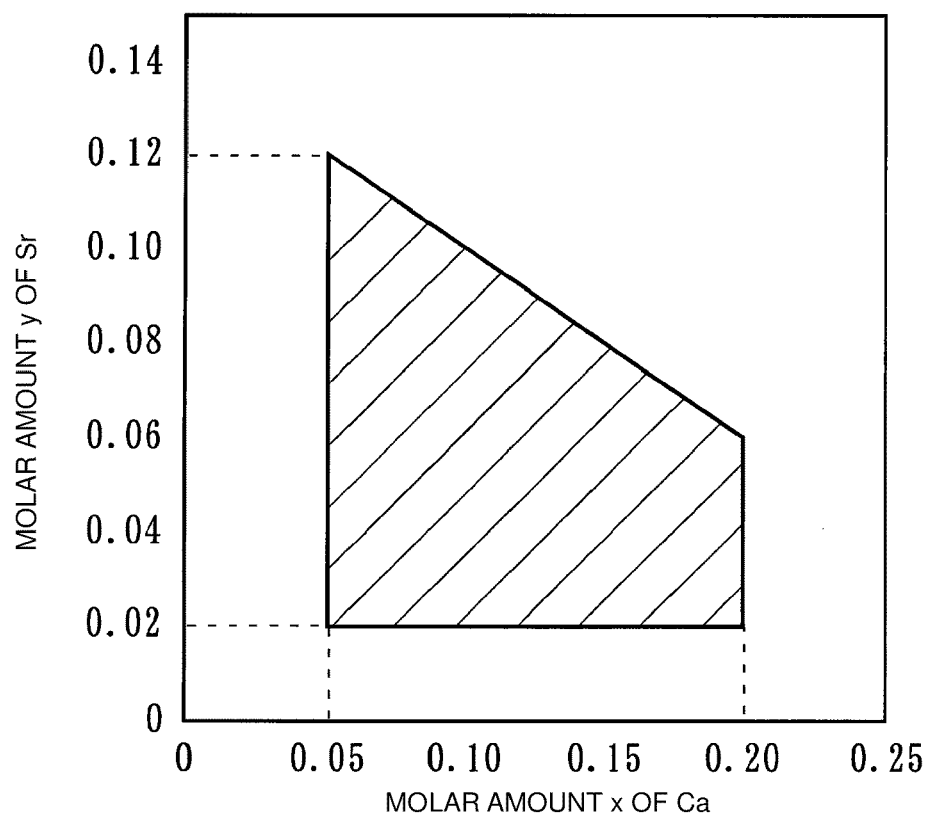
FIG. 1 is a diagram showing the composition range of the molar ratio x of Ca and the molar ratio y of Sr in the present invention.

That is, the composition range of this embodiment is specified by a diagonally shaded area of FIG. 1.

By replacing part of Ba with Ca and Sr and setting the molar amounts x and y within the range specified by the mathematical formulas (1) to (3), high reliability can be achieved even after the application of an electric current for a long time. The reason is believed to be as follows.

By replacing part of Ba with Ca, the ratio of the c axis to the a axis of the crystallographic axes is increased, and thus the tetragonal crystallinity of the crystal is improved. However, by replacing part of Ba with Ca and also Sr, the crystallinity is improved and the volatilization of Bi is suppressed. As a result, the elution of unstable Na into grain boundaries is believed to be suppressed. Furthermore, the crystallinity is improved and the ionic conduction of alkali metal ions to the anode side is suppressed by incorporating Sr in addition to Ca. As a result, discoloration of the surface is not caused even if an electric current is applied for a long time, and thus variation in resistance is believed to be prevented.

When the molar amount x of Ca in the A site is less than 0.05, the content of Ca is excessively low. Therefore, even if Sr is contained, the crystallinity cannot be sufficiently improved, and thus discoloration of the surface is caused and the resistance value may be significantly decreased after the application of an electric current for a long time.

On the other hand, when the molar amount x of Ca is more than 0.20, the solid solubility limit is exceeded. Therefore, hetero-phases are precipitated in the grain boundaries and the resistance value may be unfavorably decreased significantly after the application of an electric current for a long time.

When the molar amount y of Sr in the A site is less than 0.02, the crystallinity cannot be improved to a crystallinity that achieves the suppression of the volatilization of Bi as in the case where only Ca is contained. Thus, the reliability for the application of an electric current for a long time cannot be improved.

On the other hand, when the molar ratio y of Sr is more than 0.12, the Curie temperature Tc is unfavorably decreased to a Curie temperature lower than or equal to the Curie temperature (120° C.) of BaTiO$_3$.

The presence of Ca and Sr decreases the Curie temperature. Therefore, when 2x+5y is more than 0.7, the Curie temperature To is unfavorably decreased to a Curie temperature lower than or equal to the Curie temperature of BaTiO$_3$.

Accordingly, the semiconductor ceramic has a composition in which the molar ratio x of Ca and the molar ratio y of Sr in the A site satisfy $0.05 \leq x \leq 0.20$, $0.02 \leq y \leq 0.12$, and $2x+5y \leq 0.7$ in this embodiment, as shown by a diagonally shaded area of FIG. 1. To further improve the reliability, the molar amount x of Ca is preferably $0.125 \leq x \leq 0.175$.

The molar ratio m between the A site (Ba site) and B site (Ti site) is not particularly limited, and satisfactory PTC characteristics can be achieved when the molar ratio m is 0.992 to 1.004.

The total molar amount (u+v) of the alkali metal element M1 and Bi in the A site is preferably 0.02 to 0.20. The Curie temperature Tc is increased by replacing part of Ba with Na and Bi. Therefore, when the total molar amount (u+v) is less than 0.02, the Curie temperature Tc cannot be sufficiently increased. On the other hand, when the total molar amount (u+v) is more than 0.20, the composition is easily shifted from the theoretical composition of a sintered body because the alkali metal element M1 and Bi are easily volatilized as described above.

The molar amount w of the rare-earth element Ln in the A site is preferably 0.0005 to 0.015. This is because although the rare-earth element Ln is added as a semiconductorizing agent, it is difficult to achieve semiconductorization if the molar amount w is less than 0.0005 or more than 0.015.

In the present invention, to improve PTC characteristics, 0.0001 to 0.0020 parts of Mn is preferably added relative to 1 part of the main component represented by the general formula (A) on a molar basis.

In this case, the semiconductor ceramic is represented by general formula (B).

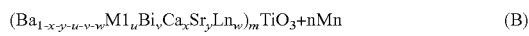

$(Ba_{1-x-y-u-v-w}M1_uBi_vCa_xSr_yLn_w)_mTiO_3+nMn$ (B)

where n satisfies $0.0001 \leq n \leq 0.0020$.

Mn functions as an acceptor. Therefore, by adding Mn within the range described above, an acceptor level is formed in the grain boundaries and thus the number of PTC digits can be increased. As a result, the PTC characteristics can be further improved. The form of Mn added is not particularly limited, and any manganese compound such as sol or powder of manganese oxide or an aqueous manganese nitrate solution can be used.

A PTC thermistor according to the present invention will now be specifically described.

Figure 2:
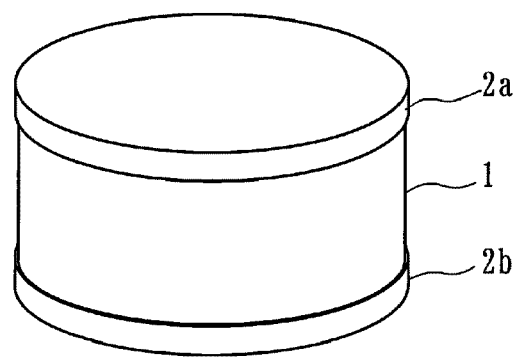
FIG. 2 is a perspective view showing an embodiment of a PTC thermistor according to the present invention.

FIG. 2 is a perspective view schematically showing an embodiment of the PTC thermistor.

The PTC thermistor includes a component body 1 formed of the above-described semiconductor ceramic and a pair of outer electrodes 2a and 2b formed on both ends (surfaces) of the component body 1. The outer electrodes 2a and 2b have a single-layer structure or a multi-layer structure and are composed of a conductive material such as Cu, Ni, Al, Cr, a Ni—Cr alloy, or a Ni—Cu alloy.

In this embodiment, the external appearance has a columnar shape, but may have a disc-like shape or a rectangular parallelepiped shape.

A method for producing the PTC thermistor will now be described.

First, a Ba compound, a Ca compound, an M1 compound containing an alkali metal element M1, a Bi compound, and a Ln compound containing a predetermined rare-earth element Ln are prepared as raw materials. The raw materials are weighed and mixed to obtain a mixed powder so that the semiconductor ceramic has a predetermined composition ratio.

Subsequently, an organic solvent and a polymer-based dispersant are added to the mixed powder and thoroughly mixed and ground by the wet method in a ball mill using grinding media such as PSZ (partially stabilized zirconia) balls. The powder is then dried and sizing is performed using a mesh having a predetermined opening. The mixture is subjected to a heat treatment at 800 to 1000° C. for 2 hours to obtain a calcined powder. A vinyl acetate-based organic binder and pure water, and optionally a Mn compound, are added to the calcined powder and again thoroughly mixed and ground by the wet method using grinding media to obtain a slurry. The slurry is dried to obtain a raw material powder. The raw material powder is then sized using a mesh having a predetermined opening and compression-molded using a press such as a uniaxial press to obtain a compact.

The compact is subjected to debinding treatment at 500 to 600° C. in an air atmosphere, a nitrogen atmosphere, or a mixed stream of air and nitrogen. Subsequently, the compact is fired in a nitrogen atmosphere whose oxygen concentration is about 100 to 10000 ppm by volume at a temperature that achieves semiconductorization, e.g., at a maximum firing temperature of 1250 to 1450° C. for a predetermined time to obtain a component body 1, which is a sintered body.

Outer electrodes 2a and 2b are formed on both ends of the component body 1 by plating, sputtering, paste baking, or the like to produce a PTC thermistor.

The present invention is not limited to the above-described embodiment. For example, the semiconductor ceramic needs only to be mainly composed of $Ba_mTiO_3$ and part of Ba needs only to be replaced with predetermined amounts of alkali metal element, Bi, Ca, Sr, and rare-earth element. Even if incidental impurities are mixed, the characteristics are not affected. For example, about 0.2 to 0.3% by weight of the total of the PSZ balls can be used as grinding media when mixing and grinding are performed by a wet method may be mixed, but this does not affect the characteristics. Similarly, trace amounts, such as about 10 ppm by weight, of Fe, Si, and Cu may be mixed in the raw materials, but this does not affect the characteristics. The semiconductor ceramic of the present invention is a lead-free semiconductor ceramic. As described in Means for Solving the Problems, it is only required that the semiconductor ceramic substantially does not contain Pb, and Pb incidentally mixed in a concentration of about 10 ppm or less by weight is not necessarily excluded as long as it does not affect the characteristics.

An example of the present invention will now be specifically described.

$BaCO_3$, $CaCO_3$, $SrCO_3$, $Na_2CO_3$, $K_2CO_3$, $Bi_2O_3$, $TiO_2$ and $Y_2O_3$, which were raw materials of a main component, were prepared and then weighed and mixed to obtain a mixed powder so that the sintered body had the composition shown in Table 1.

Subsequently, ethanol (organic solvent) and a polymer-based dispersant were added to the mixed powder and wet mixed and ground in a ball mill using PSZ balls for 24 hours. The ethanol was driven off by heating and sizing was performed using a mesh having an opening of 300 μm. The mixture was subjected to a heat treatment at 800 to 1000° C. for 2 hours to obtain a calcined powder.

A vinyl acetate-based organic binder and an aqueous manganese nitrate solution were added to the calcined powder and again wet mixed and ground in a ball mill using PSZ balls, this time for 16 hours, to obtain a slurry. The amount of the aqueous manganese nitrate solution added was adjusted to be 0.00025 parts by mole on a Mn basis relative to 1 part by mole of main component.

The slurry was dried and sized using a mesh having an opening of 300 μm to obtain a raw material powder.

The raw material powder was compression-molded using a uniaxial press at a pressure of $9.8 \times 10^7$ Pa (1000 kgf/cm²) to obtain a disc-shaped compact having a diameter of 14 mm and a thickness of 2.5 mm.

The disc-shaped compact was subjected to a debinding treatment in air at 600° C. for 2 hours. The compact was fired in a nitrogen atmosphere whose oxygen concentration was 10000 ppm by volume at a maximum firing temperature of 1400° C. for 2 hours to obtain sintered bodies (semiconductor ceramics) with a sample number of 1 to 47.

Subsequently, the sintered bodies were lapped and then subjected to dry plating to form outer electrodes having a three-layer structure of NiCr/NiCu/Ag. Consequently, sample Nos. 1 to 47 were prepared.

Regarding the sample Nos. 1 to 47, the electrical resistivity $\rho_0$ at 25° C. (room temperature), the number of PTC ΔR digits, and the Curie temperature Tc were determined.

The electrical resistivity $\rho_0$ was measured by a direct current four-terminal method through the application of a voltage of 1 V at 25° C.

The number of PTC ΔR digits indicates the performance of a PTC thermistor, and is defined by the logarithm of the ratio between the maximum value ρmax and the minimum value ρmin of electrical resistivity as represented by mathematical formula (4).

$$\Delta R = \log(\rho_{max}/\rho_{min}) \quad (4)$$

Therefore, the relationship (hereinafter referred to as "ρ-T characteristics") between temperature T and electrical resistivity ρ were measured, and the number of PTC digits was determined using the maximum value and the minimum value.

The Curie temperature Tc was defined as a temperature at which the electrical resistivity $\rho_0$ at 25° C. was doubled, and determined from the ρ-T characteristics.

Furthermore, an electric current applying test was performed to evaluate the reliability. That is, a direct-current voltage was applied so that the surface temperature of each of the samples was increased to 200° C., and the samples were left to stand for 1000 hours. The percentage change in resistivity $\rho_0$ before the test and the percentage change in resistivity $\rho_1$ after the test were measured at 25° C., and the difference $\Delta\rho$ $(=\rho_1-\rho_0)$ was determined to calculate the percentage change in resistivity $\Delta\rho/\rho_0$. The electric current applying test was performed on five specimens of each of the samples to calculate the average value of the percentage change in resistivity $\Delta\rho/\rho_0$. Accordingly, the reliability was evaluated.

Table 1 and Table 2 show the compositions and measurement results of the sample Nos. 1 to 47.

Samples having a Curie temperature of 120° C. or more and a percentage change in resistivity $\Delta\rho/\rho_0$ of 30% or less were judged as good.

TABLE 1

Composition formula: $(Ba_{1-x-y-u-v-w}M1_xBi_yCa_uSr_vY_w)_mTiO_3 + 0.00025Mn$

| Sample No. | M1 | x | y | 2x + 5y | m | u | v | w | Electrical resistivity $\rho_0$ (Ω·cm) | Number of digits of PTC ΔR | Curie temperature Tc (° C.) | Percentage change in resistivity $\Delta\rho/\rho_0$ (%) |
|---|---|---|---|---|---|---|---|---|---|---|---|---|
| 1* | Na | 0 | 0 | 0 | 1.000 | 0.05 | 0.05 | 0.002 | 71 | 3.9 | 179 | 628 |
| 2* | Na | 0 | 0.02 | 0.10 | 1.000 | 0.05 | 0.05 | 0.002 | 42 | 3.7 | 165 | 157 |
| 3* | Na | 0 | 0.04 | 0.20 | 1.000 | 0.05 | 0.05 | 0.002 | 31 | 4.2 | 157 | 131 |
| 4* | Na | 0.05 | 0 | 0.10 | 1.000 | 0.05 | 0.05 | 0.002 | 37 | 3.8 | 172 | 107 |
| 5 | Na | 0.05 | 0.02 | 0.20 | 1.000 | 0.05 | 0.05 | 0.002 | 31 | 4.1 | 159 | 27 |
| 6 | Na | 0.05 | 0.04 | 0.30 | 1.000 | 0.05 | 0.05 | 0.002 | 27 | 4.3 | 148 | 21 |
| 7 | Na | 0.05 | 0.08 | 0.50 | 1.000 | 0.05 | 0.05 | 0.002 | 24 | 3.7 | 131 | 17 |
| 8 | Na | 0.05 | 0.10 | 0.60 | 1.000 | 0.05 | 0.05 | 0.002 | 32 | 3.8 | 126 | 18 |
| 9 | Na | 0.05 | 0.12 | 0.70 | 1.000 | 0.05 | 0.05 | 0.002 | 38 | 3.5 | 121 | 20 |
| 10* | Na | 0.05 | 0.14 | 0.80 | 1.000 | 0.05 | 0.05 | 0.002 | 35 | 3.4 | 117 | 22 |
| 11* | Na | 0.10 | 0 | 0.20 | 1.000 | 0.05 | 0.05 | 0.002 | 24 | 4.2 | 168 | 84 |
| 12 | Na | 0.10 | 0.02 | 0.30 | 1.000 | 0.05 | 0.05 | 0.002 | 22 | 4.7 | 153 | 21 |
| 13 | Na | 0.10 | 0.04 | 0.40 | 1.000 | 0.05 | 0.05 | 0.002 | 17 | 5 | 144 | 15 |
| 14 | Na | 0.10 | 0.08 | 0.60 | 1.000 | 0.05 | 0.05 | 0.002 | 21 | 4.5 | 127 | 12 |
| 15 | Na | 0.10 | 0.10 | 0.70 | 1.000 | 0.05 | 0.05 | 0.002 | 26 | 4.1 | 123 | 13 |
| 16* | Na | 0.10 | 0.12 | 0.80 | 1.000 | 0.05 | 0.05 | 0.002 | 32 | 4 | 117 | 9 |
| 17 | Na | 0.125 | 0.02 | 0.35 | 1.000 | 0.05 | 0.05 | 0.002 | 19 | 4.8 | 147 | 9 |
| 18 | Na | 0.125 | 0.06 | 0.55 | 1.000 | 0.05 | 0.05 | 0.002 | 15 | 4.9 | 132 | 5 |
| 19 | Na | 0.125 | 0.09 | 0.70 | 1.000 | 0.05 | 0.05 | 0.002 | 17 | 4.1 | 123 | 3 |
| 20* | Na | 0.15 | 0 | 0.30 | 1.000 | 0.05 | 0.05 | 0.002 | 18 | 4.7 | 159 | 67 |
| 21 | Na | 0.15 | 0.02 | 0.40 | 0.992 | 0.05 | 0.05 | 0.002 | 15 | 5.5 | 140 | 9 |
| 22 | Na | 0.15 | 0.02 | 0.40 | 1.000 | 0.05 | 0.05 | 0.002 | 12 | 5.3 | 142 | 7 |
| 23 | Na | 0.15 | 0.02 | 0.40 | 1.004 | 0.05 | 0.05 | 0.002 | 9 | 4.8 | 143 | 6 |

*Outside the scope of the present invention

TABLE 2

Composition formula: $(Ba_{1-x-y-u-v-w}M1_xBi_yCa_uSr_vY_w)_mTiO_3 + 0.00025Mn$

| Sample No. | M1 | x | y | 2x + 5y | m | u | v | w | Electrical resistivity $\rho_0$ (Ω·cm) | Number of digits of PTC ΔR | Curie temperature Tc (° C.) | Percentage change in resistivity $\Delta\rho/\rho_0$ (%) |
|---|---|---|---|---|---|---|---|---|---|---|---|---|
| 24 | Na | 0.15 | 0.04 | 0.50 | 1.000 | 0.10 | 0.10 | 0.002 | 28 | 5.8 | 148 | 4 |
| 25 | Na | 0.15 | 0.04 | 0.50 | 1.000 | 0.05 | 0.05 | 0.002 | 15 | 5.4 | 135 | 5 |
| 26 | Na | 0.15 | 0.04 | 0.50 | 1.000 | 0.0375 | 0.0375 | 0.002 | 17 | 5.1 | 132 | 8 |
| 27 | Na | 0.15 | 0.04 | 0.50 | 1.000 | 0.025 | 0.025 | 0.002 | 13 | 4.8 | 129 | 7 |
| 28 | Na | 0.15 | 0.04 | 0.50 | 1.000 | 0.01 | 0.01 | 0.002 | 11 | 4.3 | 121 | 9 |
| 29 | Na | 0.15 | 0.04 | 0.50 | 1.000 | 0.051 | 0.049 | 0.002 | 17 | 5.7 | 133 | 10 |
| 30 | Na | 0.15 | 0.06 | 0.60 | 1.000 | 0.05 | 0.05 | 0.0005 | 21 | 4.9 | 132 | 8 |
| 31 | Na | 0.15 | 0.06 | 0.60 | 1.000 | 0.05 | 0.05 | 0.002 | 14 | 5.1 | 129 | 7 |
| 32 | Na | 0.15 | 0.06 | 0.60 | 1.000 | 0.05 | 0.05 | 0.005 | 18 | 4.6 | 128 | 4 |
| 33 | Na | 0.15 | 0.06 | 0.60 | 1.000 | 0.05 | 0.05 | 0.015 | 27 | 4.2 | 130 | 5 |
| 34 | Na | 0.15 | 0.08 | 0.70 | 1.000 | 0.05 | 0.05 | 0.002 | 17 | 4.7 | 123 | 3 |
| 35* | Na | 0.15 | 0.10 | 0.80 | 1.000 | 0.05 | 0.05 | 0.002 | 19 | 4.6 | 119 | 4 |
| 36 | Na | 0.175 | 0.02 | 0.45 | 1.000 | 0.05 | 0.05 | 0.002 | 18 | 5 | 136 | 7 |
| 37 | Na | 0.175 | 0.06 | 0.65 | 1.000 | 0.05 | 0.05 | 0.002 | 14 | 5.1 | 125 | 2 |
| 38 | Na | 0.175 | 0.07 | 0.70 | 1.000 | 0.05 | 0.05 | 0.002 | 17 | 4.7 | 121 | 5 |
| 39* | Na | 0.20 | 0 | 0.40 | 1.000 | 0.05 | 0.05 | 0.002 | 35 | 5.1 | 145 | 71 |
| 40 | Na | 0.20 | 0.02 | 0.50 | 1.000 | 0.05 | 0.05 | 0.002 | 32 | 5.4 | 132 | 25 |
| 41 | Na | 0.20 | 0.04 | 0.60 | 1.000 | 0.05 | 0.05 | 0.002 | 29 | 5.1 | 126 | 12 |
| 42 | Na | 0.20 | 0.06 | 0.70 | 1.000 | 0.05 | 0.05 | 0.002 | 24 | 4.7 | 121 | 13 |

TABLE 2-continued

Composition formula: $(Ba_{1-x-y-u-v-w}M1_xBi_uCa_xSr_yY_w)_mTiO_3 + 0.00025Mn$

| Sample No. | M1 | x | y | 2x + 5y | m | u | v | w | Electrical resistivity $\rho_0$ ($\Omega \cdot cm$) | Number of digits of PTC $\Delta R$ | Curie temperature Tc (°C.) | Percentage change in resistivity $\Delta\rho/\rho_0$ (%) |
|---|---|---|---|---|---|---|---|---|---|---|---|---|
| 43* | Na | 0.20 | 0.08 | 0.80 | 1.000 | 0.05 | 0.05 | 0.002 | 21 | 4.8 | 117 | 11 |
| 44* | Na | 0.25 | 0 | 0.50 | 1.000 | 0.05 | 0.05 | 0.002 | 124 | 4.1 | 134 | 98 |
| 45* | Na | 0.25 | 0.02 | 0.60 | 1.000 | 0.05 | 0.05 | 0.002 | 98 | 3.9 | 126 | 76 |
| 46* | Na | 0.25 | 0.04 | 0.70 | 1.000 | 0.05 | 0.05 | 0.002 | 76 | 3.7 | 119 | 55 |
| 47 | K | 0.15 | 0.02 | 0.60 | 1.000 | 0.05 | 0.05 | 0.002 | 25 | 4.9 | 151 | 9 |

*Outside the scope of the present invention

The sample No. 1 had a high percentage change in resistivity $\Delta\rho/\rho_0$ of 628%. This may be because, since neither Ca nor Sr was contained in a composition, the crystallinity was poor and the volatilization of Bi was facilitated during firing.

A section of the sample No. 1 was polished and observed with a microscope.

Figure 3:
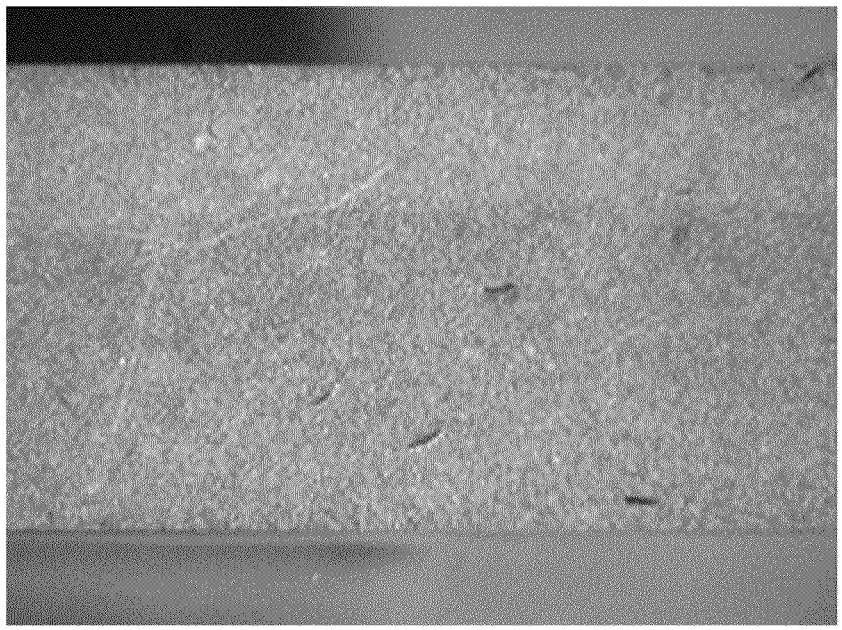
FIG. 3 is a micrograph of a sample No. 1.

FIG. 3 is a micrograph of the observation.

As is clear from FIG. 3, discoloration was observed in the anode electrode.

Since the discolored portion was believed to have a high resistance value, the surface was observed with a low accelerating voltage scanning electron microscope (low accelerating voltage SEM).

Figure 4:
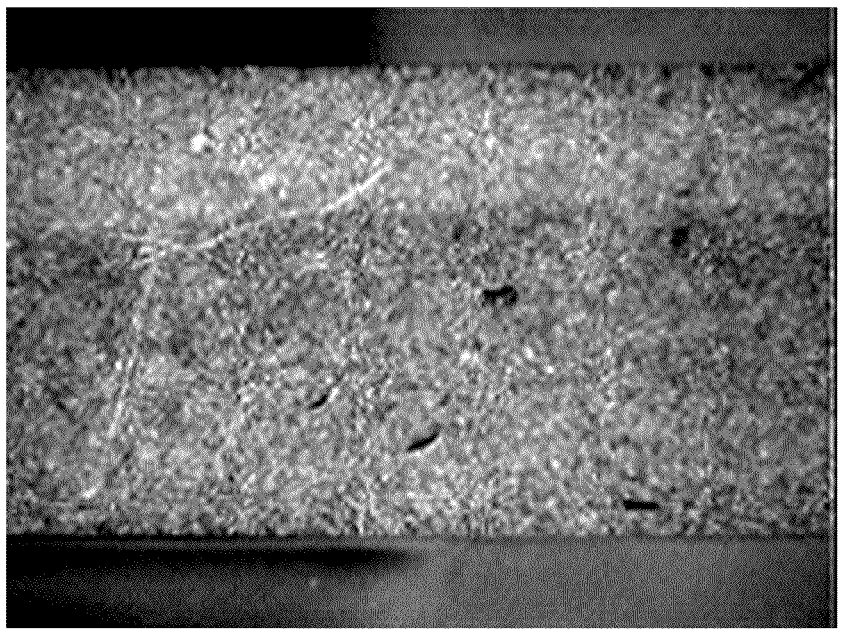
FIG. 4 is a SEM image of the sample No. 1.

FIG. 4 is the SEM image.

As is clear from FIG. 4, a white contrast was confirmed in the discolored portion. Since a SEM is an apparatus that images secondary electrons from a sample, a portion where a large number of electrons are stored is brightly seen due to a large amount of radiation of the secondary electrons. Therefore, it is believed that, there was a high-resistance layer at the boundary between the discolored portion and the non-discolored portion in the sample No. 1, and a large number of electrons were present on the negative potential side with respect to the boundary. As a result, such a contrast was produced.

It is also believed that the discoloration of the sample No. 1 was caused because Na ions were segregated by being moved to the anode side through the application of an electric current for a long time.

In the sample Nos. 2 and 3, Sr was present in an amount within the scope of the present invention, but Ca was not contained at all. Therefore, the crystallinity could not be sufficiently improved, and, as in the sample No. 1, the volatilization of Bi was facilitated and the percentage change in resistivity $\Delta\rho/\rho_0$ was increased to 130% or more. Furthermore, discoloration was slightly observed in sample Nos. 2 and 3.

As described above, it is believed that the discoloration of a surface and the decrease in reliability are closely related to each other.

In the sample Nos. 4, 11, 20, and 39, Ca was contained in an amount within the scope of the present invention, but Sr was not contained at all. Therefore, the crystallinity could not be sufficiently improved, and, as in the sample No. 1, the volatilization of Bi was facilitated and the percentage change in resistivity $\Delta\rho/\rho_0$ was increased to 30% or more.

In the sample Nos. 44 to 46, since the molar ratio x of Ca was 0.25, which was excessively high, Ca was precipitated in the grain boundaries as a result of exceeding of the solid solubility limit and the percentage change in resistivity $\Delta\rho/\rho_0$ was increased to 30% or more.

In the sample Nos. 10, 16, 35, and 43, each of Ca and Sr was contained in an amount within the scope of the present invention, but 2x+5y was 0.80, which was more than 0.7. The Curie temperature Tc was less than 120° C.

In contrast, it was found that in the sample Nos. 5 to 9, 12 to 15, 17 to 19, 21 to 34, 36 to 38, 40 to 42, and 47, the molar ratio x of Ca and the molar ratio y of Sr were within the scope of the present invention, the Curie temperature Tc was 120° C. or more and the percentage change in resistivity $\Delta\rho/\rho_0$ could be decreased to 30% or less. In particular, it was found that, when the molar ratio x of Ca was 0.125 to 0.175, the percentage change in resistivity $\Delta\rho/\rho_0$ could be decreased to 10% or less.

Figure 5:
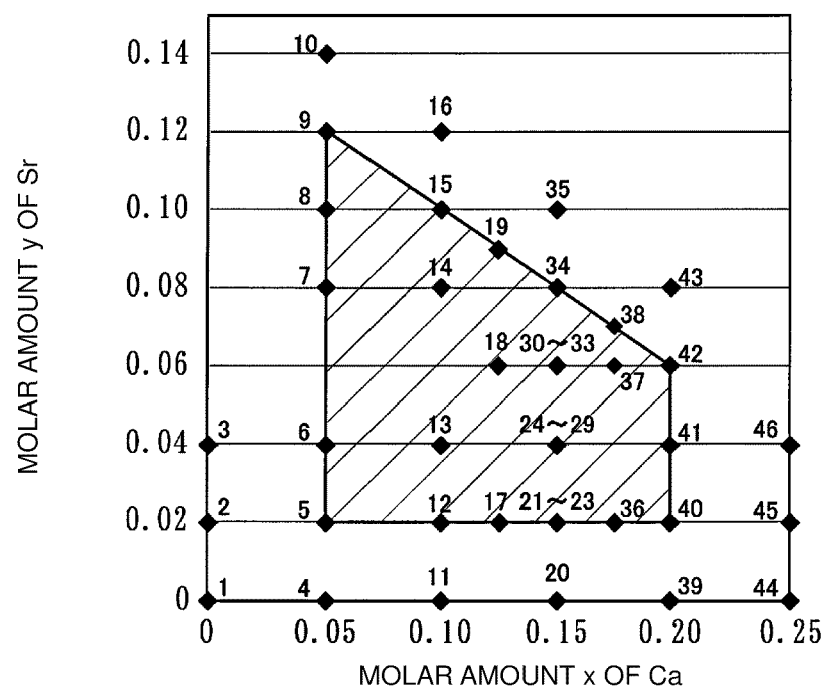
FIG. 5 is a diagram in which the measurement points of sample Nos. 1 to 46 are plotted and that shows the composition range of the present invention.

FIG. 5 is a diagram in which the measurement points of the sample Nos. 1 to 46 are plotted. The horizontal axis indicates the molar ratio x of Ca and the vertical axis indicates the molar ratio y of Sr. The diagonally shaded area indicates the scope of the present invention.

As described above, it was confirmed that a good product having a Curie temperature Tc of 120° C. or more and a percentage change in resistivity $\Delta\rho/\rho_0$ of 30% or less could be obtained in the diagonally shaded area.

1 component body 2a, 2b outer electrode

The invention claimed is:

1. A lead-free semiconductor ceramic that is substantially free of lead, the semiconductor ceramic comprising:
  a BaTiO$_3$-based composition, as a main component, having a perovskite structure represented by general formula A$_m$BO$_3$,
  wherein part of Ba constituting an A site is replaced with an alkali metal element, Bi, Ca, Sr, and a rare-earth element, and
  when the molar amount of the Ca is x and the molar amount of the Sr is y, and the total number of moles of the elements constituting the A site is 1 mole, $0.05 \leqq x \leqq 0.20$, $0.02 \leqq y \leqq 0.12$, and $2x+5y \leqq 0.7$.

2. The semiconductor ceramic according to claim 1, wherein $0.125 \leqq x \leqq 0.175$.

3. The semiconductor ceramic according to claim 2, wherein the alkali metal element is at least one of Na and K.

4. The semiconductor ceramic according to claim 3, further containing 0.0001 to 0.002 parts by weight of Mn per part of the main component.

5. The semiconductor ceramic according to claim 4, wherein $0.04 \leqq y \leqq 0.10$, and $2x+5y \leqq 0.6$.

6. The semiconductor ceramic according to claim 1, wherein the alkali metal element is at least one of Na and K.

7. The semiconductor ceramic according to claim 1, further containing 0.0001 to 0.002 parts by weight of Mn per part of the main component.

8. The semiconductor ceramic according to claim 4, wherein $0.04 \leqq y \leqq 0.10$, and $2x+5y \leqq 0.6$.

9. A substantially lead-free semiconductor ceramic having the compositional formula

where M1 is an alkali metal, Ln is a rare earth metal, $0.0005 \leq w \leq 0.015$, $0.05 \leq x \leq 0.20$, $0.02 \leq y \leq 0.12$, $2x+5y \leq 0.7$, $0.02 \leq u+v \leq 0.15$, and $0.0001 \leq n \leq 0.0020$.

10. The semiconductor ceramic according to claim 9, wherein $0.125 \leq x \leq 0.175$, $0.04 \leq y \leq 0.10$, and $2x+5y \leq 0.6$.

11. A positive temperature coefficient thermistor comprising a component body and electrodes on an outer surface of the component body,
wherein the component body is formed of the semiconductor ceramic according to claim 10.

12. A positive temperature coefficient thermistor comprising a component body and electrodes on an outer surface of the component body,
wherein the component body is formed of the semiconductor ceramic according to claim 9.

13. A positive temperature coefficient thermistor comprising a component body and electrodes on an outer surface of the component body,
wherein the component body is formed of the semiconductor ceramic according to claim 8.

14. A positive temperature coefficient thermistor comprising a component body and electrodes on an outer surface of the component body,
wherein the component body is formed of the semiconductor ceramic according to claim 7.

15. A positive temperature coefficient thermistor comprising a component body and electrodes on an outer surface of the component body,
wherein the component body is formed of the semiconductor ceramic according to claim 6.

16. A positive temperature coefficient thermistor comprising a component body and electrodes on an outer surface of the component body,
wherein the component body is formed of the semiconductor ceramic according to claim 5.

17. A positive temperature coefficient thermistor comprising a component body and electrodes on an outer surface of the component body,
wherein the component body is formed of the semiconductor ceramic according to claim 4.

18. A positive temperature coefficient thermistor comprising a component body and electrodes on an outer surface of the component body,
wherein the component body is formed of the semiconductor ceramic according to claim 3.

19. A positive temperature coefficient thermistor comprising a component body and electrodes on an outer surface of the component body,
wherein the component body is formed of the semiconductor ceramic according to claim 2.

20. A positive temperature coefficient thermistor comprising a component body and electrodes on an outer surface of the component body,
wherein the component body is formed of the semiconductor ceramic according to claim 1.

* * * * *